United States Patent
Sala et al.

(10) Patent No.: US 7,925,699 B2
(45) Date of Patent: Apr. 12, 2011

(54) TECHNIQUE FOR RELIABLE MESSAGE CONFIRMATION

(75) Inventors: Paola Sala, Heidelberg (DE); Georg Podhajsky, Phillippsburg (DE); Ralf Sievers, Walldorf (DE); Andre Wagner, Sinsheim (DE)

(73) Assignee: SAP Ag, Walldorf (DE)

( * ) Notice: Subject to any disclaimer, the term of this patent is extended or adjusted under 35 U.S.C. 154(b) by 1391 days.

(21) Appl. No.: 11/046,125

(22) Filed: Jan. 28, 2005

(65) Prior Publication Data

US 2005/0188201 A1 Aug. 25, 2005

(30) Foreign Application Priority Data

Jan. 30, 2004 (EP) .................................... 04002164

(51) Int. Cl.
*G06F 15/16* (2006.01)
*G06F 15/173* (2006.01)
*G06F 9/44* (2006.01)
*G06F 9/46* (2006.01)
*G06F 11/30* (2006.01)
*G06F 3/00* (2006.01)
*G06F 13/00* (2006.01)
*G06F 11/00* (2006.01)
*G08C 25/00* (2006.01)
*H03M 13/00* (2006.01)
*H04L 1/00* (2006.01)

(52) U.S. Cl. ........ 709/204; 709/218; 709/224; 709/228; 709/237; 709/248; 719/314; 714/746; 714/799

(58) Field of Classification Search .......... 709/203–205, 709/218, 223, 224, 227, 228, 237, 248, 249; 719/313, 314, 329; 714/746, 799
See application file for complete search history.

(56) References Cited

U.S. PATENT DOCUMENTS 5,649,105 A * 7/1997 Aldred et al. ................. 709/220
(Continued)

FOREIGN PATENT DOCUMENTS

WO    WO 03/093946 A2    11/2003
(Continued)

OTHER PUBLICATIONS

RosettaNet Implementation Framework: Core Specification, Version V02.00.01, Revised Mar. 6, 2002, 125 pages.

*Primary Examiner* — Ian N Moore
*Assistant Examiner* — Melvin H Pollack
(74) *Attorney, Agent, or Firm* — Finnegan, Henderson, Farabow, Garrett & Dunner, LLP

(57) ABSTRACT

A technique for exchanging messages in a computer network using a public data template and a message transfer protocol with interdependent request and confirmation messages is described. A request message includes a first data structure obtained by packing application data that requires confirmation in the public data template. A network component receiving the request message unpacks the application data and provides the unpacked application data to a confirmation process. At the same time, the unpacked application data provided to the confirmation process is repacked in the public data template to generate a second data structure. The second data structure is sent with a confirmation message via the computer network to the sender of the request message. By comparing the content of the first data structure with the content of the second data structure, inconsistencies degrading the accuracy and trustworthiness of the confirmation process may be detected.

20 Claims, 14 Drawing Sheets

U.S. PATENT DOCUMENTS

| | | | |
|---|---|---|---|
| 6,640,241 B1 * | 10/2003 | Ozzie et al. | 709/204 |
| 6,915,523 B2 * | 7/2005 | Dong et al. | 719/319 |
| 6,934,756 B2 * | 8/2005 | Maes | 709/227 |
| 6,990,513 B2 * | 1/2006 | Belfiore et al. | 709/203 |
| 7,051,071 B2 * | 5/2006 | Stewart et al. | 709/204 |
| 7,072,934 B2 * | 7/2006 | Helgeson et al. | 709/203 |
| 7,130,885 B2 * | 10/2006 | Chandra et al. | 709/206 |
| 7,240,199 B2 * | 7/2007 | Tomkow | 713/168 |
| 7,249,157 B2 * | 7/2007 | Stewart et al. | 709/204 |
| 7,315,613 B2 * | 1/2008 | Kleindienst et al. | 379/88.13 |
| 7,328,243 B2 * | 2/2008 | Yeager et al. | 709/205 |
| 7,342,888 B2 * | 3/2008 | Sengodan | 370/236 |
| 7,363,495 B2 * | 4/2008 | Felt et al. | 713/170 |
| 7,516,191 B2 * | 4/2009 | Brouk et al. | 709/217 |
| 7,519,546 B2 * | 4/2009 | Murren et al. | 705/26 |
| 7,555,538 B2 * | 6/2009 | Shenfield et al. | 709/219 |
| 7,627,658 B2 * | 12/2009 | Levett et al. | 709/223 |
| 7,774,831 B2 * | 8/2010 | Kuznetsov et al. | 726/12 |
| 2003/0041147 A1 * | 2/2003 | van den Oord et al. | 709/227 |
| 2003/0041178 A1 * | 2/2003 | Brouk et al. | 709/313 |
| 2003/0061279 A1 * | 3/2003 | Llewellyn et al. | 709/203 |
| 2003/0154154 A1 | 8/2003 | Sayal et al. | |
| 2005/0049924 A1 * | 3/2005 | DeBettencourt et al. | 705/21 |
| 2005/0060372 A1 * | 3/2005 | DeBettencourt et al. | 709/206 |

FOREIGN PATENT DOCUMENTS

WO     WO 03/094055 A1     11/2003

\* cited by examiner

TECHNIQUE FOR RELIABLE MESSAGE CONFIRMATION

DESCRIPTION OF THE INVENTION

1. Field of the Invention

The invention relates to the exchange of messages in a computer network. More specifically, the invention relates to a message choreography (or message transfer protocol) that includes the exchange of request and confirmation messages.

2. Background of the Invention

With the advent of powerful computer networks, novel forms of utilizing computers have evolved. Whereas conventionally tasks were performed only on a single computer, collaborative and network-based workflows involving a plurality of different computers have become ubiquitous.

Typical characteristics of many collaborative workflows include request and confirmation processes. That is, one requesting computer sends a request message via a computer network to a message recipient asking for confirmation of the message content. The message recipient subjects the message content to an internal confirmation process to generate a confirmation result (e.g., an approval or rejection). The confirmation result is then inserted in a confirmation message which is sent back to the computer that requested confirmation.

One example of such a request and confirmation process is an automated invoicing workflow typically involving a billing computer of a first computer system that is coupled via the Internet or any other (usually public) network with a customer computer of a second computer system. An internal or external event triggers the billing computer of the first system to send an invoice request message including invoice data that has to be confirmed by the customer computer of the second system. There, the invoice data is processed to determine whether to reject or approve the invoice data for payment. In a next step, an invoice confirmation message indicating rejection, approval (or pending approval) of the invoice data is generated and sent back to the billing computer of the first system.

In this example, the request message and the confirmation message are interdependent and reflective of a predefined message transfer protocol. This means that a confirmation message is only sent if there has been a preceding request message, and each request message requires a subsequent confirmation message.

The processes involved in collaborative workflow scenarios of the above type can be divided in two categories. Processes that are internal to a particular system (or computer) are called private processes, while processes that involve interactions with another system (or computer) via the Internet or any other public or non-public network are known as public processes.

Private processes, such as the generation of invoice data, are performed by local applications that generally utilize application-specific data structures. Unlike private processes, public processes are interface processes that are visible between the communicating systems. In general, public processes involve standardized data structures and standardized message transfer protocols. This approach insures a high interoperability between the interfacing systems.

There have been various attempts to provide industry-wide standards for public processes to facilitate collaborative workflows involving several computers or several computer systems. One of these attempts is the RosettaNet specifications (see www.rosettanet.org). Provided that the data formats and sequence of message exchanges (i.e., the message transfer protocol) as executed by the public processes all conform to the RosettaNet specifications, a high interoperability and messaging reliability is achieved.

It has been found that the RosettaNet specifications, or similar specifications, if implemented by all computer systems (or computers) participating in a collaborative, network-based workflow, greatly accelerate and facilitate the workflow from a technical point of view. However, in many cases opposite public processes, or the interface processes between public processes and corresponding private processes, do not or not completely conform to one and the same specification. This lack of uniform adoption is particularly true for workflows that involve non-homogeneous computer networks like the Internet or loosely coupled computer systems of cooperating organizations that rely on different application providers.

As a result, information that is to be transferred between two private processes (e.g., internal applications) via two public processes interfacing each other via a computer network may get lost or corrupted. For example, the receiving public process may not be familiar with the format of a received message or the receiving private process may only partially support a particular format of data extracted from a received message. Due to data loss and data corruption, confirmation processes become unreliable and untrustworthy.

The object underlying the invention is to improve the reliability, trustworthiness and accuracy of confirmation processes performed in a non-homogeneous computer network or by loosely coupled computers or computer systems.

SUMMARY OF THE INVENTION

According to a first aspect of the invention, a method for exchanging messages in a computer network using a public data template and a message transfer protocol with request and confirmation messages is provided, comprising the steps of receiving a request message via the computer network, the request message including a first data structure obtained by packing application data that requires confirmation in the public data template, unpacking the application data included in the first data structure, providing the unpacked application data to a confirmation process and to a packing process, the packing process including packing the unpacked application data in the public data template to generate a second data structure, creating a confirmation message responsive to the request message, the confirmation message including the second data structure, and transmitting the confirmation message via the computer network to a message recipient.

According to a further aspect of the invention that may synergistically be combined with the first aspect, the invention provides a method for exchanging messages in a computer network using a public data template and a message transfer protocol with request and confirmation messages relating to application data that requires confirmation, comprising the steps of providing a first data structure obtained by packing the application data in the public data template, creating a request message including the first data structure, transmitting the request message via the computer network to a message recipient, receiving a confirmation message responsive to the request message via the computer network, the confirmation message including a second data structure with the application data that was provided to a confirmation process packed in the public data template, and comparing the content of the first data structure with the content of the second data structure to determine inconsistencies degrading the reliability, accuracy or trustworthiness of the confirmation process.

The step of packing the application data in the public data template may involve a formatting step. The formatting step may include converting the application data from a (typically application-specific) first format in a second format specified by the public data template. Likewise, the step of unpacking the application data may involve converting the application data from the second format specified by the public data template back in the first format or in a third format different from the first format. Accordingly, each individual packing and unpacking step may comprise one or more formatting operations. The formatting operations may, for example, include mapping processes.

The data template utilized in the exchange of the request and confirmation messages is public in that both sides involved in the confirmation process that takes place via the computer network have knowledge thereof. The reliability, accuracy and trustworthiness of the confirmation process is improved by utilizing the public data template not only for packing the application data sent with the request message, but by additionally returning the unpacked application data as subjected to the confirmation process in the public data template. An automatic comparison of the content of the public data template packed by the requesting system with the content of the public data template packed by the confirming system allows for a fast and reliable detection of technical errors or formatting problems that may have occurred in a path between a first application generating the application data that require confirmation and a second application in charge of confirming the application data.

Data inconsistencies or semantical inconsistencies detected by the comparison are indicative of a loss or an (intentional or technically induced) corruption of the application data after their generation. Accordingly, such inconsistencies result in a diminished reliability, accuracy and trustworthiness of a confirmation result obtained by the confirmation process because the confirmation result might have been derived on the basis of incorrect or incomplete application data.

Detection of inconsistencies may trigger an automatic dispute management routine. The automatic dispute management routine may include a retransmission of the application data, an automatic notification of the confirming side that the confirmation is not accepted, the generation of an error message on the requesting side, or further measures dependent on system settings.

The confirmation result generated during the confirmation process, such as an approval, a rejection or a pending (or partial) approval of the application data, may be inserted in the confirmation message in addition to the application data provided to the confirmation process. In one embodiment of the invention, multiple confirmation messages are transmitted. A first confirmation message includes the data structure with the application data provided to the confirmation process and a second confirmation message additionally or only includes the confirmation result. Such an approach is advantageous because depending on the nature of the confirmation process, generation of the confirmation result may take some time and may even require human interaction (although the confirmation process will in general run automatically). By using multiple confirmation messages the first confirmation message including the application data (as provided to the confirmation process) can be generated and transmitted immediately after receipt of the request message. This approach provides an early assessment of the reliability, accuracy and trustworthiness of the anticipated confirmation result, even if the confirmation result has not yet been generated or if the second confirmation message including the confirmation result has not yet been sent.

In one embodiment of the invention, the request and confirmation messages are exchanged in context with a predefined collaborative network-based workflow involving a plurality of computers or computer systems. A plurality of such workflows may be performed in parallel. This approach means that an individual computer or computer system may simultaneously participate in a plurality of workflows that each involve an exchange of request and confirmation messages. Thus, a particular computer or computer system may have transmitted a plurality of request messages relating to different workflows and will wait for one or more corresponding confirmation messages, or it may have received a plurality of request messages (in context with different workflows) and will generate a corresponding plurality of confirmation messages. It should be noted that in principal, each individual confirmation process, and thus each individual workflow, may include more than one request message and more than one confirmation message. Such a multiplicity of messages of a particular type within a single workflow may give rise to further problems. Solutions to those problems will be discussed in more detail later.

At least one of the request messages and the confirmation messages may be queued in one or more message queues. In the case of a plurality of workflows that are performed in parallel, a particular computer or computer system may queue the messages for each workflow separately. Moreover, messages of different types may be queued in different queues. Such a queuing means, for example, that request messages can be queued separately from confirmation messages. Moreover, outgoing messages may be queued separately from incoming messages. Such a differentiation of message queues ensures that the messages are processed in the right order, which is particularly useful in the case of multiple workflows running in parallel and/or in the case of an individual workflow involving more than one request message and/or more than confirmation message. The necessity to send more than one confirmation message may, for example, be the result of transmitting the application data provided to the confirmation process independently from the confirmation result obtained by the confirmation process.

In one implementation of the invention, the request and confirmation messages are exchanged synchronously. That is, the application generating the application data to be confirmed triggers a request message and refrains from further processing the application data until a (trustworthy) confirmation message has been received. According to a further scenario, the request and confirmation messages are exchanged asynchronously. In such a scenario, the application that has generated the application data for confirmation triggers a request message and continues processing the application data under the assumption of a positive confirmation result (and without suspending processing of the application data until a trustworthy and positive confirmation result has been received).

Asynchronous message exchange may require the resetting of the application processing the application data in the case a negative confirmation result is received or a confirmation result that is not trustworthy is (or will be) received. Such resetting may include undoing all processing steps that have been performed since the request message has been triggered.

According to one implementation of the invention, the application data packed in the data template includes a first identification code. The first identification code may be an application-specific identification code characteristic of a particular set of application data that requires confirmation.

The identification code may denote a particular document, a particular workflow or a portion of a particular workflow. An example of such an identification code would be an invoice number or a delivery number. Preferably, the first identification code is not only included in the data structure transmitted in a request message, but also in the data structure transmitted in a confirmation message responsive to this request message. In such a case, the first identification code cannot be utilized to differentiate different messages. Should such a differentiation be required, a message-specific second identification code may be assigned to at least one of the request message and the confirmation message. The second identification code can advantageously be used for referencing purposes in following messages within a particular workflow. Each message may be attributed with a worldwide unique second identification code.

At least one of the request message and the respondent confirmation message may include a message header and a message payload. The message header may include a third identification code required by the communications infrastructure. The message payload may include the second identification code and the data structure with the application data comprising the first identification code.

According to one variant of the invention, at least one of packing and unpacking of the application data includes a mapping operation. Such a mapping operation may comprise extracting data from individual fields of the data structure specified by the data template and writing the data in an application-specific (non-public) data template or vice versa. Any inconsistencies occurring during such mapping operations may be reliably detected by the inventive approach outlined above. The mapping may conform to the RosettaNet specifications.

The public data template may be hierarchically structured. The hierarchical or any other structure of the public data template may be realized using two or more different data packages. Preferably, each individual data package specified by the public data template includes semantically related data. The semantically related data included in each data package may be derived from one or more standardized data types. The use of data templates, data packages and standardized data types allows to achieve a high interoperability.

The invention can be implemented as a hardware solution, as software running on one or more components of a computer network or as a combination thereof. Accordingly, the invention also relates to a computer program product comprising program code portions for performing the above steps when the computer program product is run on a computer system. The computer program product may be stored on a computer-readable recording medium.

According to a further aspect of the invention, a network component for generating messages that are exchanged in a computer network using a public data template and a message transfer protocol with request and confirmation messages is provided. The network component comprises a first interface for receiving a request message via the computer network, the request message including a first data structure obtained by packing application data that requires confirmation in the public data template, a first unit for unpacking the application data included in the first data structure, a second unit for providing the unpacked application data to a confirmation process and for providing the unpacked application data to a packing process that packs the unpacked application data in the public data template to generate a second data structure, a third unit for creating a confirmation message respondent to the request message, the confirmation message including the second data structure, and a second interface for transmitting the confirmation message via the computer network to message recipient. The first and the second interface may be one and the same interface. Alternatively, the first interface could be separate from the second interface.

The network component can at least partially be configured as an interfacing component that is arranged between the computer network and an application component which performs the confirmation process. Thus, the first unit for subjecting the unpacked application data to the confirmation process may be coupled to (or constituted by) the application component and the first interface, and the second interface of the interfacing component may be coupled to the computer network.

According to a still further aspect of the invention, a network component is provided for generating messages that are exchanged in a computer network using a public data template and a message transfer protocol with request and confirmation messages relating to application data that requires confirmation. The network component comprises a first unit for providing a first data structure obtained by packing the application data in the public data template, a second unit for creating a request message including the first data structure, a first interface for transmitting the request message via the computer network to a message recipient, a second interface for receiving a confirmation message responsive to the request message via the computer network, the confirmation message including a second data structure with the application data provided to the confirmation process packed in the public data template, and a third unit for comparing the content of the first data structure with the content of the second data structure to detect any inconsistencies degrading the trustworthiness of the confirmation process. The first interface and the second interface may be one and the same interface. Alternatively, the first interface may be separate from the second interface.

The network component may at least partially be configured as an interfacing component coupled between an application component generating the application data and the computer network. Accordingly, the first unit may be implemented as a third interface coupled to the application component. The first interface and the second interface may be coupled to the computer network.

The data structures exchanged in the request and confirmation messages via the computer network may be XML (extended markup language) structures or structures defined by a similar language derived from SGML (standardized generalized markup language). The computer network may be the Internet, an intranet, or any other network. The invention can be implemented in a non-homogeneous network connecting different types of network systems and cooperating applications from different application providers The present invention can be practiced in any distributed system in which confirmation processes are performed in response to a confirmation request. A typical implementation of the present invention could be a communications protocol as used to communicate via the Internet or via a wireless communications network. According to a preferred implementation, the exchange of request and confirmation messages is performed in a billing and/or invoicing context.

BRIEF DESCRIPTION OF THE DRAWINGS

Further details, embodiments, modifications and enhancements of the present invention may be obtained from consideration of the following description of various illustrative embodiments of the invention in conjunction with the drawings, in which.

DETAILED DESCRIPTION OF PREFERRED EMBODIMENTS

In the following description, specific details are set forth, such as particular data formats and messaging protocols utilized in connection therewith, for purposes of explanation and not limitation, in order to provide a thorough understanding of the present invention. It will be apparent to one skilled in the art that the present invention may be practiced in other embodiments that depart from these specific details. In particular, while the different embodiments described herein below may be incorporated into or used in conjunction with particular workflow types and particular types of request and confirmation schemes, it will be appreciated by the skilled artisan that the present invention is applicable to a wide variety of workflows and other request and confirmation schemes. Where appropriate, the same reference numbers will be used throughout this detailed description in conjunction with the drawings to refer to the same or like parts.

Figure 1:
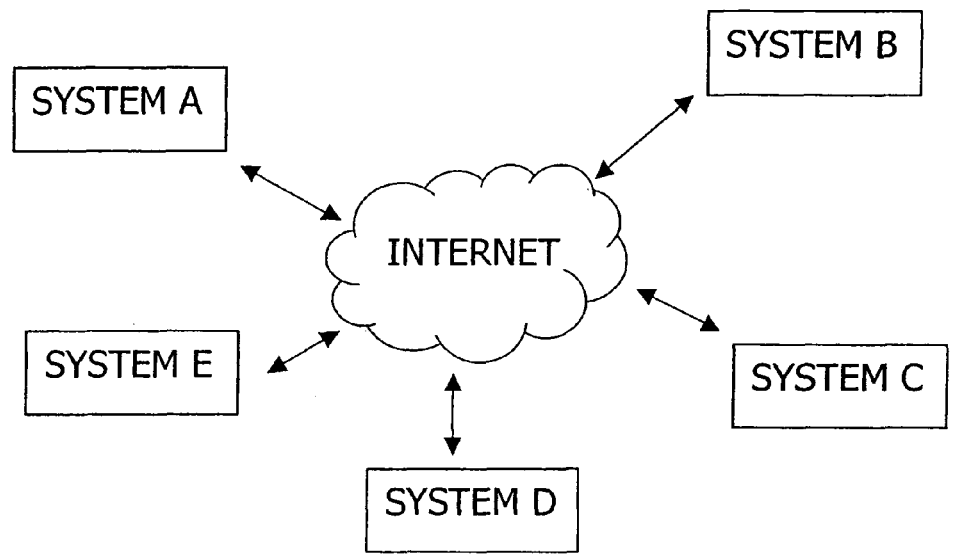
FIG. 1 is a schematic diagram illustrating a plurality of computer systems coupled via a computer network.

FIG. 1 illustrates a simplified block diagram of a computer network according to the present invention having a plurality of computer systems that are coupled via the public Internet. The computer systems coupled via the Internet participate in a collaborative workflow that incorporates a message transfer protocol with interdependent request and configuration messages as described in more detail below.

Each of the computer systems participating in the workflow is comprised of individual software and hardware components that internally act in accordance with the client/server concept as service providers, service requesters, or both. One possible client/server configuration (embodied in the individual computer systems shown in FIG. 1) is the so-called three-tiered architecture which separates a computer system's components into three functional groups: presentation, application, and database (as illustrated in FIG. 2).

Figure 2:
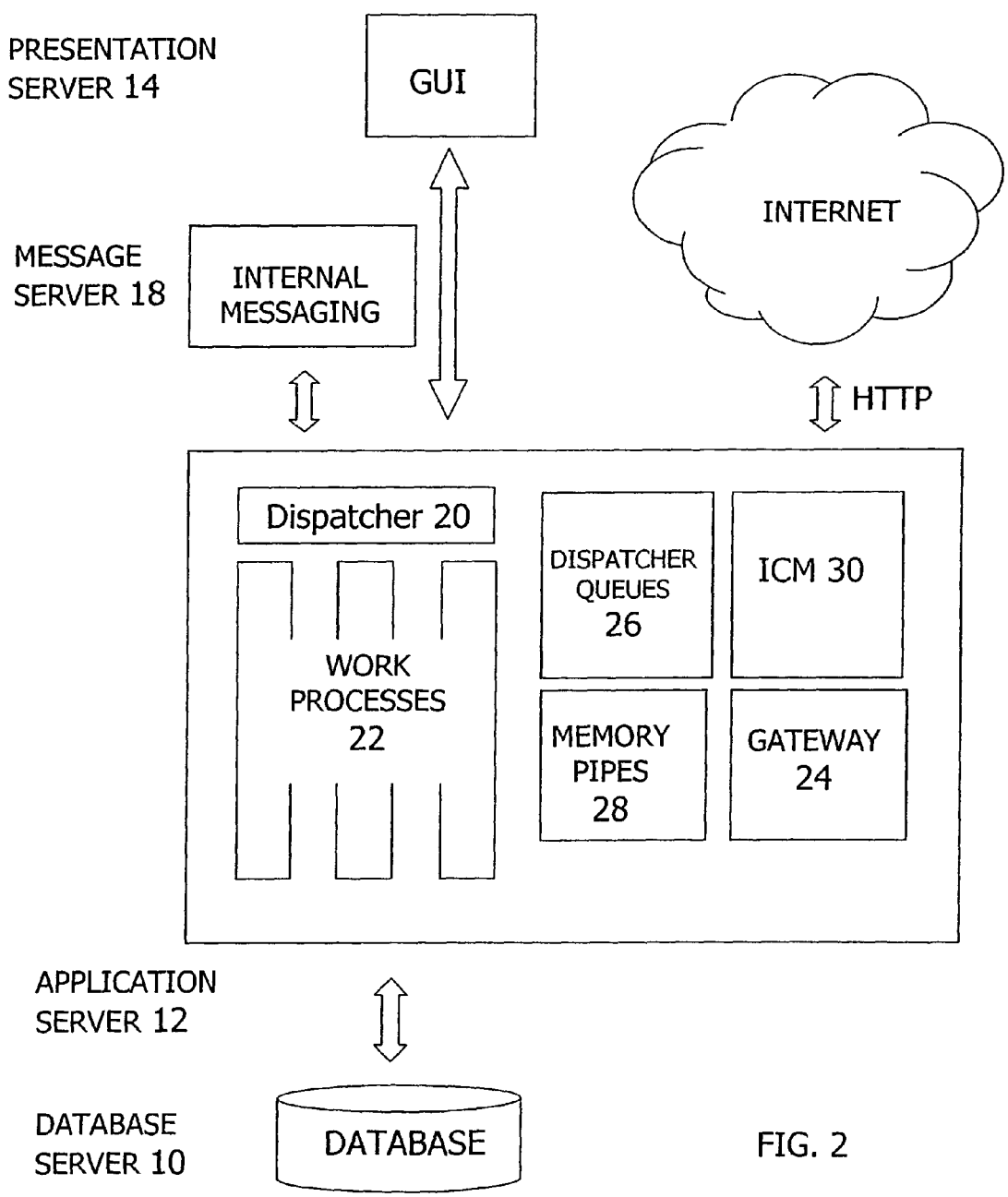
FIG. 2 is a schematic diagram illustrating a three-tiered client/server configuration of an individual computer system.

With the three-tiered architecture shown in FIG. 2, each functional group can be set up to support demands of its services. A database server 10 contains one or more system databases. An application server 12 interfacing the database server 10 includes the system processing logic and provides services such as spooling, dispatching user requests, and formatting data. Tasks related to data presentation are handled by the presentation server 14, which may be, for example, a personal computer or work station, enabling easy access to the system. If required, an additional message server 18 may be provided for controlling the communication between different application servers 12. Communication among the individual tiers can be accomplished with standard protocol services, such as those provided by TCP/IP or CPIC. CPIC stands for Common Programming Interface Communication ("CPIC"). CPIC includes standard functions and services for program-to-program communication.

As becomes apparent from FIG. 2, the software components used in context with the present invention include a Graphical User Interface (GUI) installed on each of the presentation server 14 and an application (not explicitly shown in FIG. 2) that runs on the application server 12. The application has interfaces to the database installed on the database server 10, to the Internet and, via a messaging component installed on the message server 18, to the GUI. The main tasks of the message server 18 include the transfer of internal and control messages and the distribution of work load between individual application servers 12.

The application running on the application server 12 includes a dispatcher 20 interfacing the message server 18 and one or more presentation servers 14 on the one hand, and a plurality of parallel work processes 22 on the other hand. Each work process 22 has an interface to the database. Furthermore, a gateway 24 is provided that may either be installed, from a hardware point of view, on the application server 12 or on a dedicated gateway server (not shown). The gateway service provided by the gateway 24 allows for communication between different applications using the TCP/IP protocol. The function of the gateway 24 is to exchange large amounts of data between application servers, in contrast to the message server 18 which only exchanges brief internal and control messages. The application server 12 running on the application depicted in FIG. 2 further includes dispatcher queues 26, memory pipes 28 and an Internet Communication Manager (ICM) 30. The ICM 30 allows the direct processing of HTTP requests (or other protocols) received from the Internet and/or a browser running on a presentation server 14, and for sending HTTP requests as HTTP client requests to the Internet. The ICM 30, which may be configured as a dedicated kernel process, uses threads to communicate as a server or as a client on the Internet.

In the following the interrelation among the individual components depicted in FIG. 2 is described in more detail.

As data is entered in the presentation server 14 (or otherwise generated), the data is received by the GUI, converted to a standard format, and sent to the dispatcher 20. The connection between the GUI on the presentation server 14 and the dispatcher 20 is made with a protocol like DIAG, that allows to create small data packages.

The dispatcher 20 checks whether there are available work processes 22 for processing the request received from the presentation server 14. A work process 22 is a program in charge of executing the application tasks of the present invention. A workflow typically involves a plurality of such work processes 22. Each work process 22 acts as a specialized system service. From the point of view of an operating system, a group of parallel work process 22 as depicted in FIG. 2 makes up a runtime system. Each individual work process 22 includes a task handler, a processor, and a database interface (not shown).

If no work processes are available, a processing request received directly from the presentation server 14 or via the messaging sever 18 is kept together with other requests in the dispatcher queues 26 until a work process becomes available. Once a work process becomes available, the dispatcher 20 sends the user data to the available work process 22.

The work processes 22 may execute dialogue steps for the presentation server 14. These steps generally relate to the processing or display of a single GUI screen, which means that right after one work process 22 finishes the execution of a dialogue step for a user session, it is immediately available for use by another user session. For its processing, each dialogue step requires code, dictionary objects, and data. These elements may come from the database residing on the database server 10 or from an internal memory of the application server 12. Within a dialogue step, the task handler assigns the corresponding tasks to the internal components (dialogue interpreter and processor), finally sending a SQL request to the database server 10. The database server 10 retrieves the requested data from the database and sends the requested data back to the work process 22, which in turn processes it and passes it via the dispatcher 20 to the presentation server 14. The GUI on the presentation server 14 then formats the requested data and builds up the screen for the user. If during a particular work process 22 application data has to be exchanged with other applications such as legacy applications or external applications, the functionality of the gateway 24 is activated.

If an HTTP request is being processed by a work process 22, the memory pipes 28 are used for data transfer. The memory pipes 28 are located in a shared memory portion. In its Web client position a workflow 22 creates an HTTP request that is sent to a Web server. It then receives the HTTP response and the workflow 22 proceeds on the basis of the HTTP response.

Figure 3:
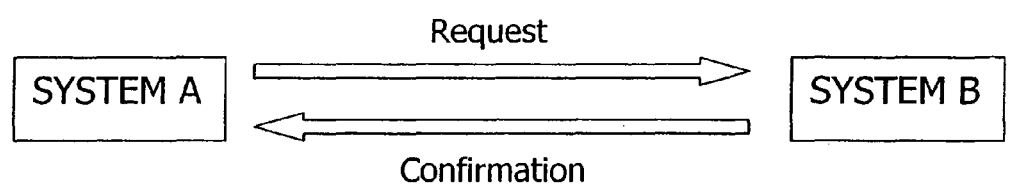
FIG. 3 is a schematic diagram illustrating the exchange of request and confirmation messages between the computer systems shown in FIG. 1.

According to one embodiment of the invention, two computer systems each having a configuration as shown in FIG. 2 or a similar configuration may participate in a collaborative workflow that requires the exchange of information as shown in FIG. 3. In the present case, information is exchanged using messages of different message categories. Messages can be categorized according to their binding character (e.g. the assurance associated with sending a message and/or the expectation as to the message recipient), according to the presence of preceding messages, and according to the expectance of subsequent messages.

As illustrated in FIG. 3, computer systems A and B communicate on the basis of a request and confirmation scheme. In this context, a request is associated with a (binding) demand or requirement relating to a particular recipient. A confirmation is a (binding) response which, in general, follows a request message. A request can involve more than one request message and a confirmation can include more than one confirmation message. A request is associated with a subsequent (confirmation) message, and a confirmation message requires the existence of a preceding (request) message.

Request and confirmation schemes of the type shown in FIG. 3 are usually part of a larger processing context, also called workflow, involving several computers or computer systems. Examples of various embodiments of such workflows involving two collaborating computers or computer systems will be described herein. It will be apparent to the skilled artisan that the invention could also be practiced in context with workflows involving more than two computer systems or involving only the computers of a single computer system.

Figure 4:
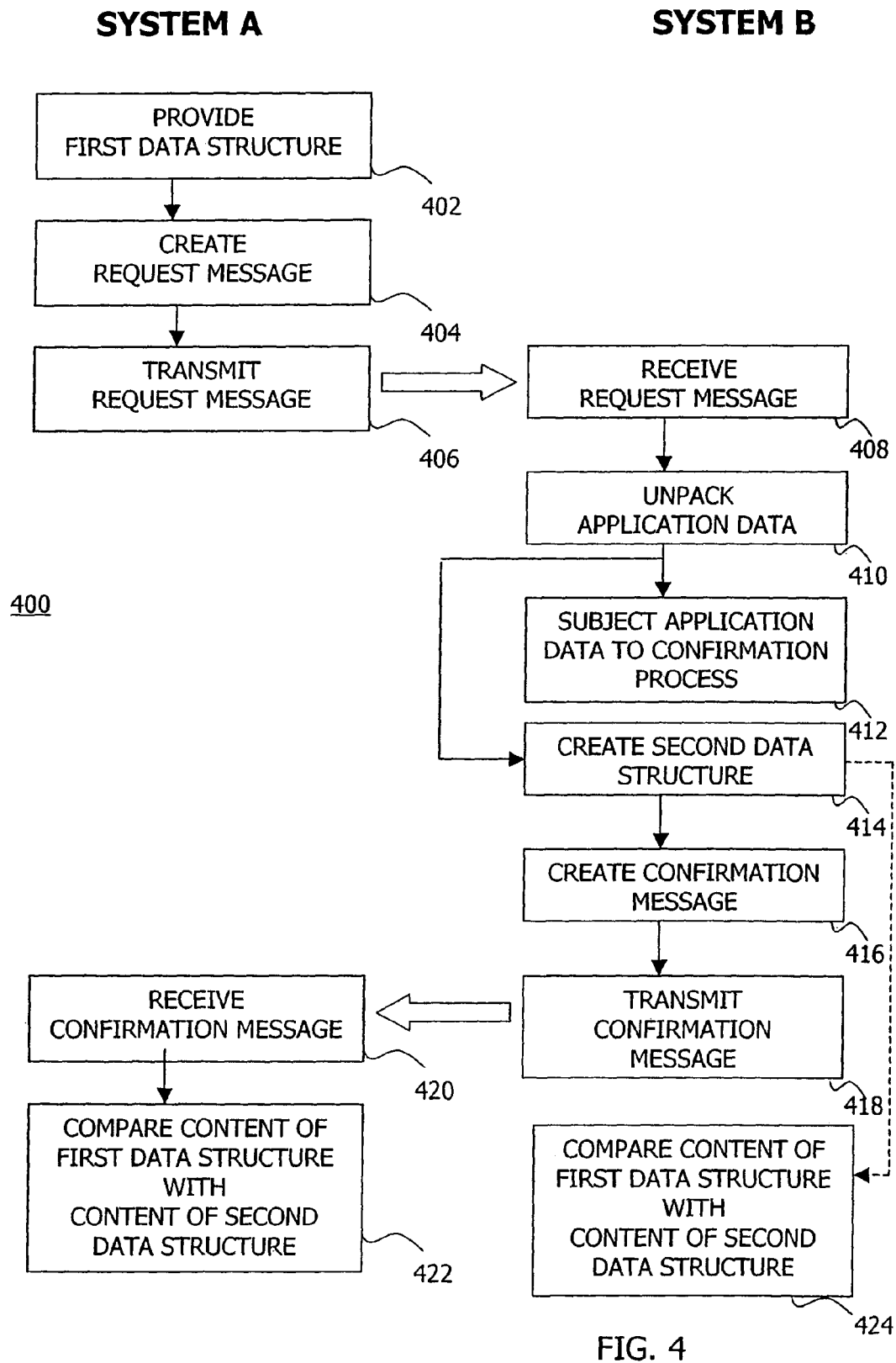
FIG. 4 is a flowchart illustrating a method for exchanging request and confirmation messages.

FIG. 4 shows an embodiment of a workflow 400 in accordance with the present invention involving two computer systems participating in a request and confirmation scheme as generally depicted in FIG. 3.

In a first step 402 of the workflow 400, a first data structure is provided on the side of computer system A. The first data structure has been obtained by packing previously-generated application data that requires confirmation in a public data template. In a next step 404, a request message is generated. The request message includes the first data structure with the application data and has the character of a binding demand (or request) in relation to the application data. In step 406, the request message including the first data structure is transmitted via the Internet or any other computer network to a message recipient (i.e., to computer system B). Transmission of the request message may involve the use of intermediary components such as routers.

Computer system B receives the request message in step 408. In step 410, it unpacks the application data included in the request message. The unpacked application data is then provided to a confirmation process in step 412 which generates a confirmation result with respect to the content of the application data. Additionally, the unpacked application data is provided to a packing process to create a second data structure in step 414. Creation of the second data structure includes (re-)packing the application data unpacked in step 410 in the public data template.

In a next step 416, computer system B creates a confirmation message responsive to the request message received in step 408. The confirmation message created in step 416 includes the second data structure with the application data unpacked in step 410. If available, the confirmation message may additionally include the confirmation result obtained in step 412. However, the confirmation result could also be sent with a dedicated second confirmation message at a different point in time and in general after the (first) confirmation message including the application data that is to be confirmed. In step 418, the confirmation message created in step 416 is transmitted via the computer network to the message recipient (i.e., to computer system A). Transmission of the confirmation message may involve intermediary components such as routers.

Computer system A receives the confirmation message including the second data structure in step 420. In step 422, computer system A compares the content of the first data structure provided in step 402 with the content of the second data structure received with the confirmation message in step 420. The comparison in step 422 can be performed on a data structure level or may include a comparison of application data extracted from the respective data structure.

Although the comparison of the content of the first data structure with the content of the second data structure is preferably performed on the side of computer system A, it may additionally or alternatively be performed on the side of computer system B as indicated by step 424. Upon detection of inconsistencies in any one or both of steps 422 and 424, a dispute management routine may be called on the side of one or both of computer systems A and B. The dispute management routine includes measures such as the retransmission of the first data structure to computer system B and/or of the second data structure to computer system A, a notification of the complementary computer system, and the like.

The comparison steps 422 and 424 allow detection of inconsistencies influencing the trustworthiness (or reliability) of the confirmation process. More specifically, inconsistencies influencing the trustworthiness of the confirmation result obtained in step 412 and received with the confirmation message including the application data that required confirmation (or with a dedicated separate confirmation message) can be detected. The detected inconsistencies may result, for example, from incorrect packing or unpacking of the data structures (e.g., from mapping errors), intentional or accidental modification of the application data on their way through the computer network, incompatible public processes (see FIG. 7 below), or the like.

Ideally, the content of the first data structure provided in step 402 should correctly (e.g., in the correct fields, at the correct positions, etc.) be included in the second data structure received by computer system A with the confirmation message. This, however, does not prevent computer system B from including additional data not included in the application data received via the request message in the second data structure. The additional data may, for example, include the confirmation result obtained by the confirmation process (such as a coded representation of the acceptance status of the application data subjected to the confirmation process), an internal identification code assigned by the confirmation process for differentiating and referencing purposes, a textual description referring to the acceptance status, and the like.

Figure 5:
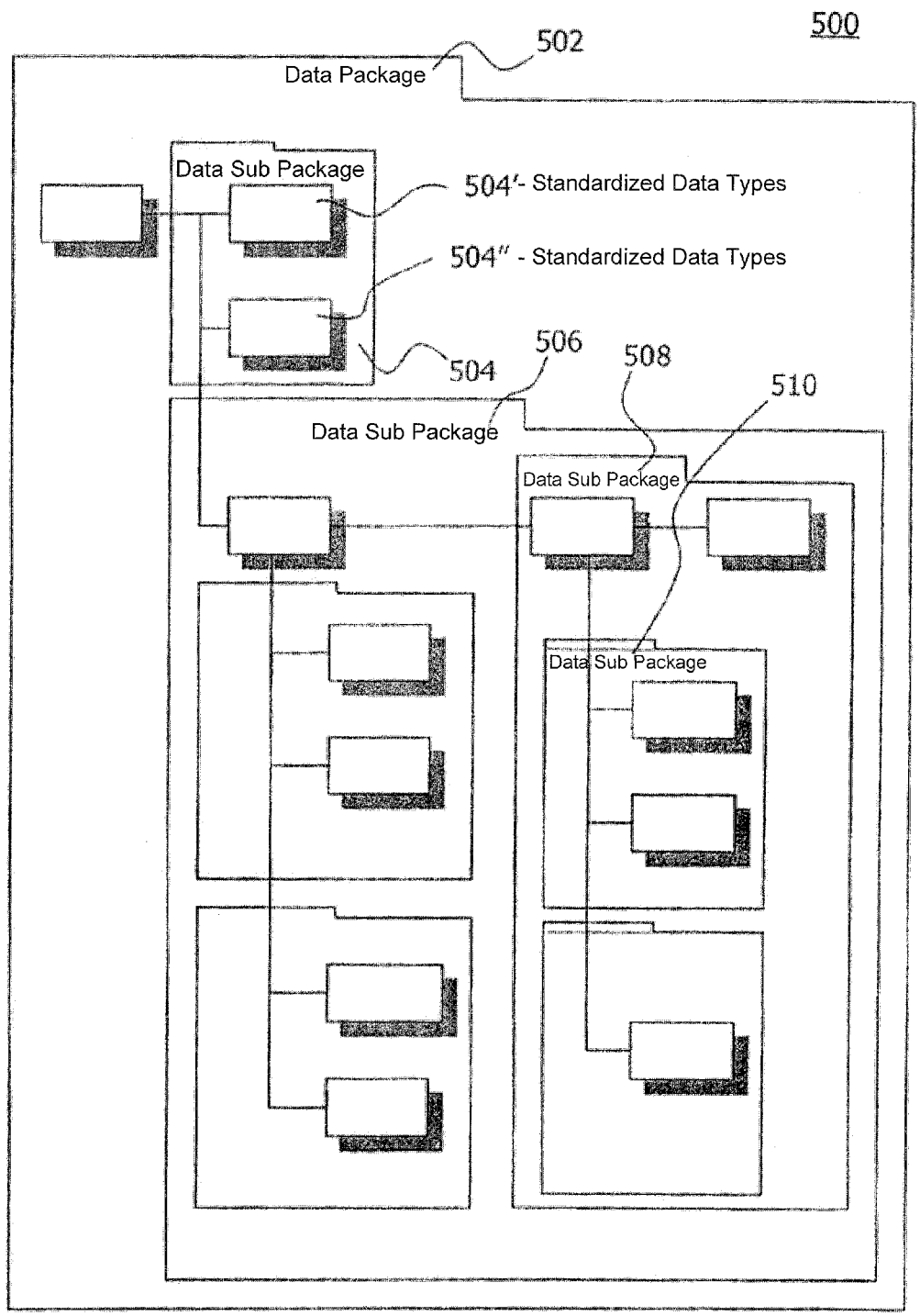
FIG. 5 is a schematic diagram illustrating a hierarchically-structured public data template.

As has been explained with reference to FIG. 4, the first and second data structures are obtained by packing application data in a public data template. Generally, both sides involved in the exchange of request and confirmation messages must have knowledge of the structure of the public data template. FIG. 5 schematically shows the structure of such a public data template 500. The public data template 500 may be an XML document type definition (DTD) or an XML schema definition (XSD) or a Web Service Description Language (WSDL) document.

As becomes apparent from FIG. 5, the public data template 500 is hierarchically structured and specifies individual data packages 502, 504, 506, 508, 510, etc. Each of these data packages includes semantically-related data derived from standardized data types. In an exemplary document confirmation context, data package 502 may embrace all data required by the involved applications and computer systems to address, transmit, verify, etc. the document data. Data sub-package 504 may be a standard document header including standardized data types 504', 504" relating, for example, to a message identification code and an indication of the recipient party. Data sub-package 506 may include the actual document data. These document data may comprise item data (data sub-package 508) which could in turn include quantity data (data sub-package 510), etc.

Figure 6:
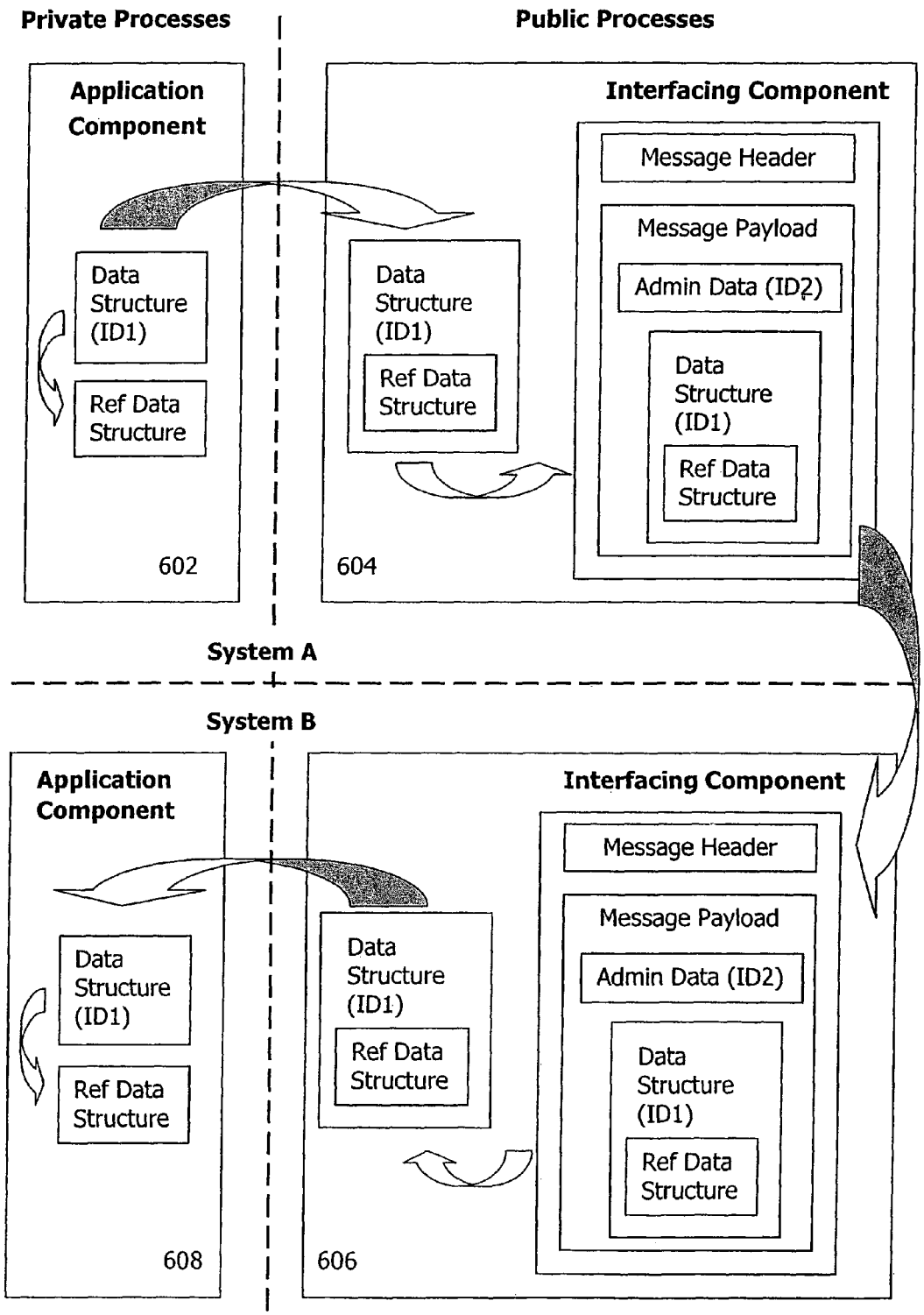
FIG. 6 is a schematic diagram illustrating the generation and exchange of messages between two computer systems participating in a collaborative workflow.

The individual components and processes involved in a typical request and confirmation scheme, and their cooperation, will be described in more detail with reference to the embodiment shown in FIG. 6. In FIG. 6, the processes performed by computer systems A and B are categorized into private processes on the one hand and public processes on the other hand. Whereas the private processes do not involve any interaction with the respective remote system, the public processes are configured as interface processes coupling the cooperating computer systems to the communications infrastructure. The private processes include an application component 602 on the side of computer system A and an application component 608 on the side of the computer system B. The public processes are performed by an interfacing component 604 on the side of computer system A and an interfacing component 606 on the side of computer system B. The interfacing components 604, 606 correspond to the gateway 24 of FIG. 2.

The cooperation of the individual processes and components shown in FIG. 6 will now be described. The private process performed by application component 602 is configured to generate application data and to pack the application data in a pre-defined public data template to create a data structure. The application data included in the data structure include an application specific first identification code (ID1) such as, for example a document number. Moreover, the data structure may include a reference to another data structure that has been sent earlier or that has not yet been sent. For referencing purposes, the application-specific identification code of the referenced data structure may be used. Additionally, or alternatively, the data structure provided by the application component 602 may include a reference to an earlier message (e.g., ID2 explained below).

Upon an internal or external trigger event, the application component 602 transfers the data structure including the proprietary identification code ID1 (and, if required, the identification code of a referenced data structure and/or message) to the interfacing component 604. The skilled artisan will recognize that instead of creating the data structure by the application component 602, the data structure may alternatively be created by the interfacing component 604. In this case, the application component 602 transfers the application data to the interfacing component 604, and the interfacing component 604 generates the data structure by packing the application data into the public data template.

Once the data structure is available to the interfacing component 604, the interfacing component 604 starts with generating the (request) message that is to be sent to computer system B. As shown in FIG. 6, the generated message includes a message header and a message payload. It may additionally include one or more attachments (not shown).

The message header specifies parameters such as the message type, the generation date of the message, etc. The message payload includes the data structure to be transferred as well as further administrative data including a message-specific and worldwide unique second identification code (ID2). If required, a third identification code (ID3) utilized by a communications network (e.g., for routing purpose) may be included in the message header.

The different identification codes are utilized to uniquely identify individual data structures, individual messages, etc. This approach is particularly useful in context with request and confirmation schemes that require more than one request message and/or more than one confirmation message. The use of different and multiple identification codes is also advantageous if several request confirmation processes are performed in parallel.

Once the interfacing component 604 has created the message that is to be transmitted to computer system B, the message may be placed in a dedicated transmission queue or it may be transmitted directly via the computer network to the interfacing component 606 of computer system B. Upon message receipt, the interfacing component 606 extracts the data structure from the received message and transfers the extracted data structure to the application component 608. The application component 608 unpacks the application data included in the data structure and performs an automatic confirmation process with respect to the unpacked data. The confirmation process may include evaluating a data object (like a set of previously received application data) referenced in the newly received application data.

After having unpacked the application data, the application component 608 packs the unpacked application data and, if required, additional data generated by the application component 608 in the public data template and transfers the data structure thus obtained to the interfacing component 606, which creates a (confirmation) message responsive to the request message as explained above in context with the interfacing component 604. It will then be the task of application component 602 to compare the data structure transmitted via the request message with the data structure included in the confirmation message.

Figure 7A:
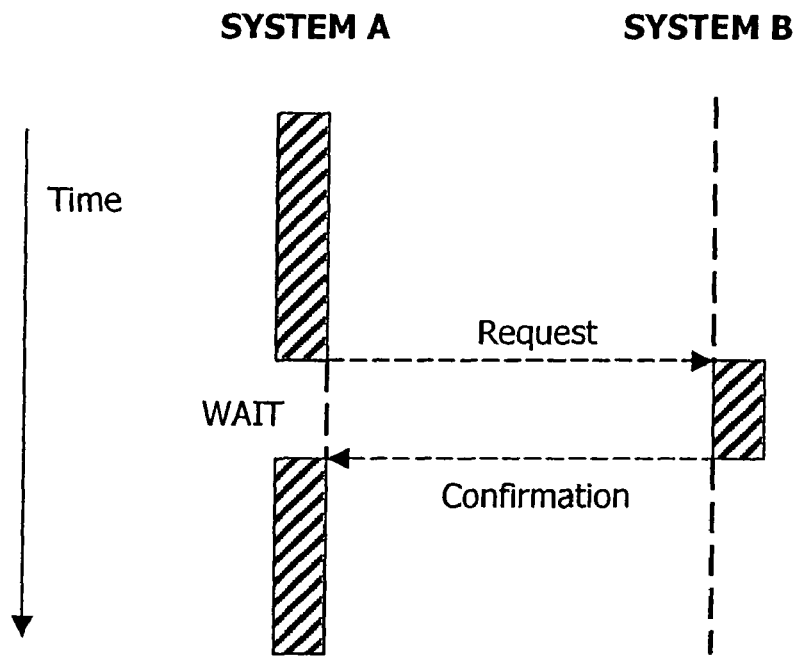
FIGS. 7A and 7B are schematic diagrams illustrating synchronous and asynchronous modes of operation.

Communication between the two sides participating in a request and confirmation scheme may be performed synchronously, asynchronously, or as a combination thereof. FIG. 7A shows a synchronous messaging scenario between computer system A and computer system B. In the synchronous scenario, the request and confirmation messages are logically and technically serialized. This serialization means that after having transmitted a request message, computer system A waits and refrains from further processing the application data for which confirmation was requested until a respondent confirmation message from computer system B has been received.

Figure 7B:
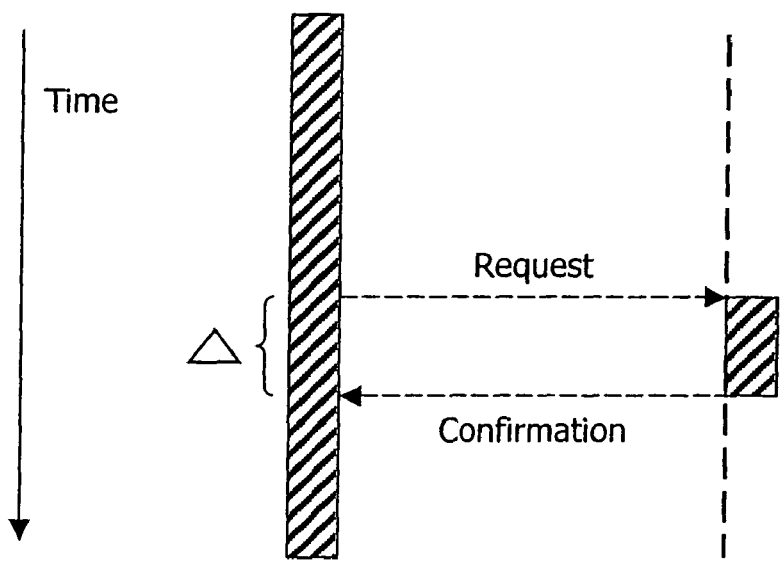

An asynchronous messaging scenario is depicted in FIG. 7B. The advantage of the asynchronous messaging scenario is that the communicating computer systems remain to a large extent independent. In other words, upon transmission of a request message, the transmitting system may continue processing the application data that have to be confirmed without waiting for a response from the remote side. This continued processing implies a rather loose coupling of the collaborating systems because the request and confirmation messages are not serialized (i.e. are not considered as a logical unit of work (LUW) but as two separate process steps). However, the lack of synchronization of the cooperating computer systems requires that in the case of a negative or an untrustworthy confirmation result, the application that has continued processing the application data subjected to the confirmation process has to be reset. This reset requires means that all changes (denoted as A in FIG. 7B) that have been made since the application data have been submitted to the confirmation process have to be undone.

Figure 8:
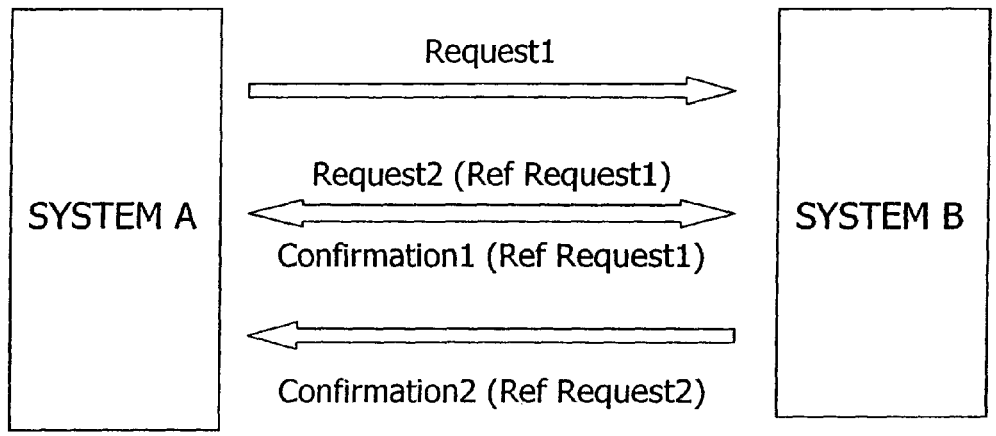
FIG. 8 is a schematic diagram illustrating a process involving two confirmation messages.

A further aspect that has to be considered in the case of asynchronous communication scenarios with (logically and technically) unserialized request and confirmation messages is that under certain circumstances, a further request message may have been sent prior to receipt of a confirmation relating to a preceding request message. Such a scenario involving an asynchronous collaborative workflow with multiple request messages and multiple confirmation messages is shown in FIG. 8.

In a first step, computer system A sends a first request message (request1) including a unique message identification code and application data that require confirmation to computer system B. Without waiting for a confirmation message from computer system B, computer system A continues processing the application data under the assumption of a positive and trustworthy confirmation result. During this further processing, it is detected that the application data that have been sent with request1 require a modification. Accordingly, a second request message (request2) with a unique message identification code, with the modified application data and with a reference to request1 (i.e. with the unique message identification code of request1) is transmitted to computer system B.

Prior to receipt of request2, computer system B transmits a first confirmation message (confirmation1) rejecting confirmation of the unmodified application data to computer system A. Confirmation1 includes a data structure with the application data (as subjected to the confirmation process), the confirmation result and a reference to request1 in the form of the unique message identification code of request1. From this identification code (and additionally from the content of the data structure included in confirmations) computer system A determines that the negative confirmation result applies to request1 (and the unmodified application data transmitted therewith), and not to request2. As a new request message has already been sent (request2), computer system A may disregard confirmations.

As in the meantime computer system B has received request2 (including the modified application data and a reference to request1), computer system B may immediately associate the content of request2 with the (rejected) content of request1. Computer system B may then generate a second confirmation message (confirmation2) including the modified application data as subjected to the (second) confirmation process, a unique message identification code and a reference to the message identification code of request2. In a last step, confirmation2 is sent to computer system A.

Figure 9:
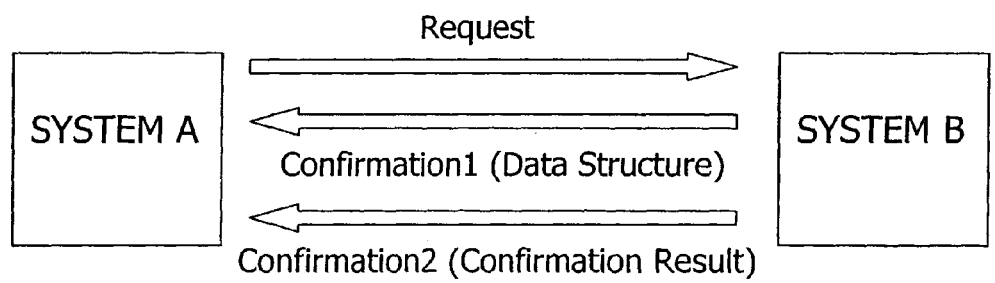
FIG. 9 is a schematic diagram illustrating a process involving two request messages and two confirmation messages.

A further messaging scenario involving a single request message and two separate confirmation messages is schematically shown in FIG. 9. In the example illustrated in FIG. 9, the method starts with sending a request message including a data structure with application data that requires confirmation to computer system B. Computer system B answers with an immediate first confirmation message (confirmation1) acknowledging receipt of the application data. That is, computer system B repacks the application data (unpacked from the data structure received with the request message) in the public data template and transmits the data structure thus obtained with confirmations (and without waiting for the conclusion of the confirmation process to which the application data have been subjected) to computer system A. Upon receipt of confirmations, computer system A compares the data structure included in the original request message with the data structure received with confirmations. Thus, computer system A may detect, at a very early stage, any semantical or other inconsistencies that could influence the trustworthiness and reliability of a confirmation result received only via a later confirmation message (confirmation2). In asynchronous communication scenarios as depicted in FIG. 7B, such an approach allows to keep the number of further processing operations A that might have to be reset or undone in the case of an untrustworthy or unreliable confirmation process low.

Figure 10:
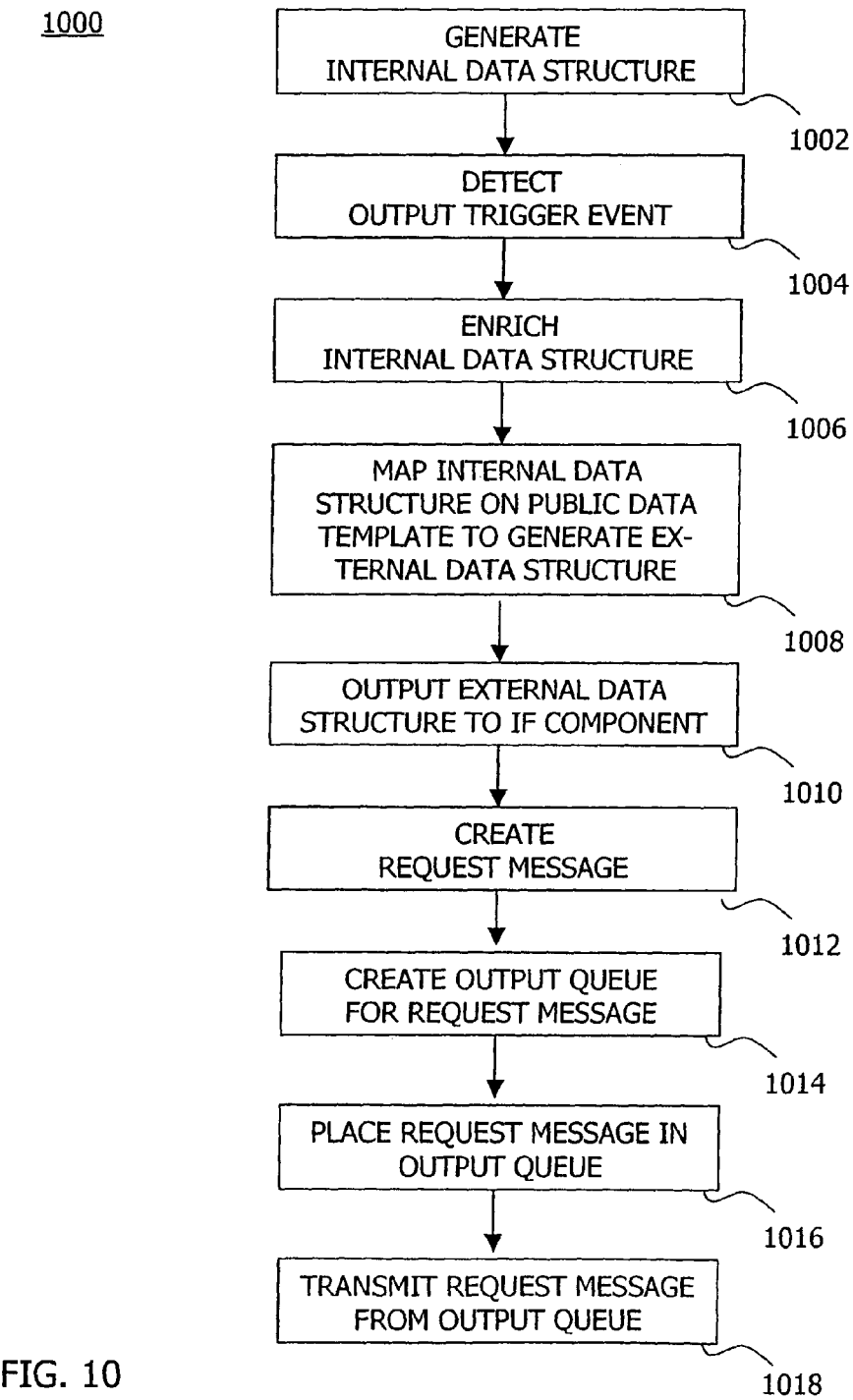
FIG. 10 is a flowchart illustrating the generation and transmission of a request message using message queues.

FIG. 10 shows a flow chart 1000 that depicts the process of transmitting a request message from an output queue. The queuing of messages may be performed in context with any of the embodiments of the invention described above.

In a first step 1002, an application generates an application specific internal data structure. Upon a trigger event (such as a status change relating to the internal data structure) in step 1004, the internal data structure is enriched as required (e.g. by ISO codes) in step 1006. In step 1008, the internal data structure is mapped (e.g. in accordance with the RosettaNet specifications) on a public data template to generate an external data structure. In a next step 1010, the external data structure is output to an interfacing component. The interfacing component creates a request message including the external data structure and further data in step 1012.

In step 1014, the interfacing component creates a new output queue for the request message if no output queue is available for the particular workflow. This approach means that in the scenario depicted in FIG. 8 a new message queue may be created for request1, whereas request2 is placed in the message queue that has earlier been created for request1.

In step 1016, the newly-created request message is placed in the newly-created or already-existing output queue. The flow chart 1000 shown in FIG. 10 concludes with transmitting the request message from the output queue in step 1018.

Within a particular workflow, messages can be transmitted exactly once in order (EOIO). In this context, message queues may be used for serialization purposes. That is, in the exemplary scenario shown in FIG. 8 that queued request1 will always be transmitted before queued request2. In the case of parallel confirmation workflows, separate message queues may be utilized for each individual workflow. Furthermore, message queues may not only be utilized for outgoing messages but also for incoming messages. This means in the scenario shown in FIGS. 8 and 9, using message queues for incoming confirmation messages, computer system A will always process confirmation1 prior to confirmation2. The use of multiple message queues helps to prevent situations in which a single erroneous message prevents processing of all further messages within a particular system.

Figure 11:
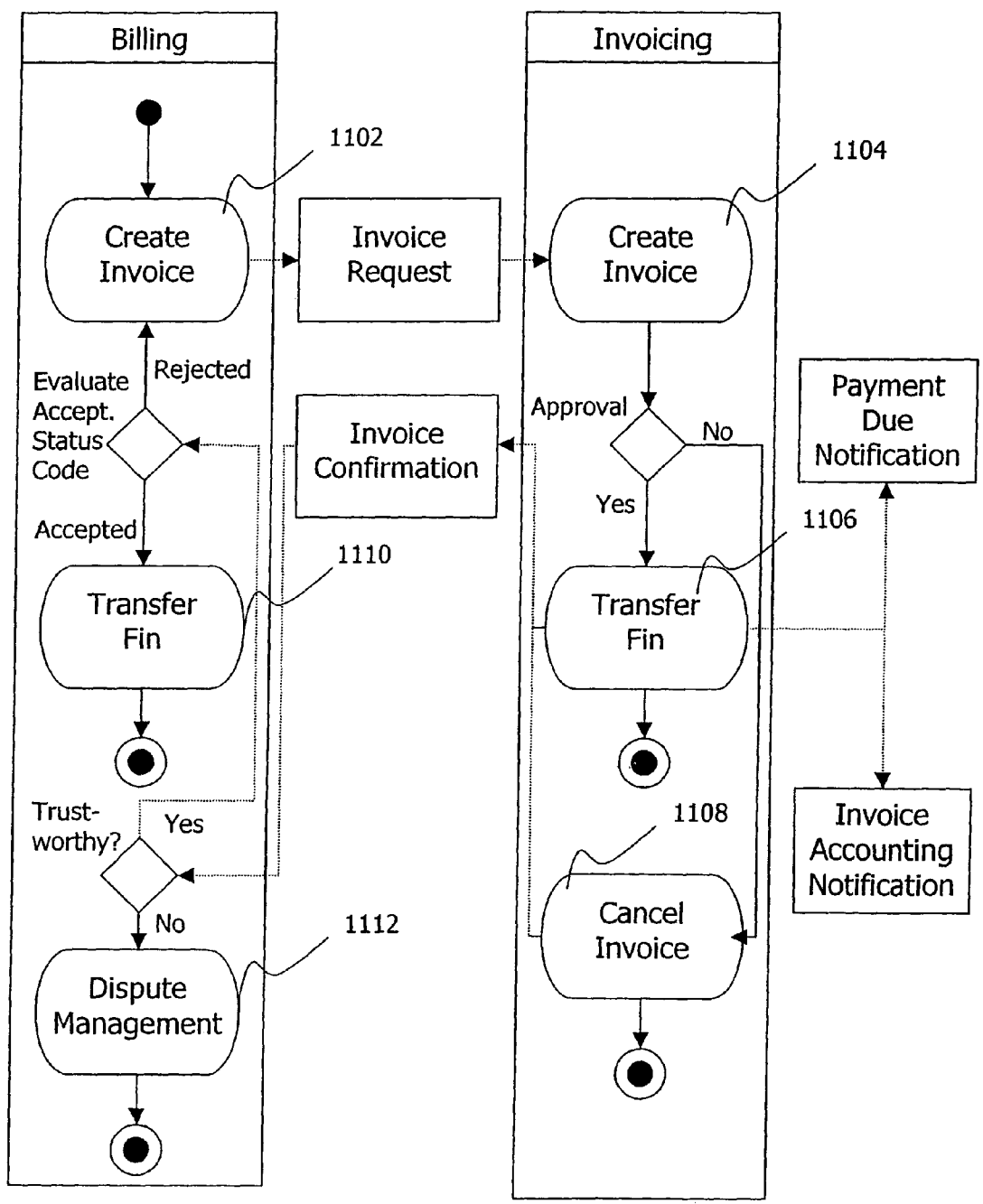
FIG. 11 is a schematic flowchart illustrating an exemplary workflow according to the present invention.
Figure 12A:
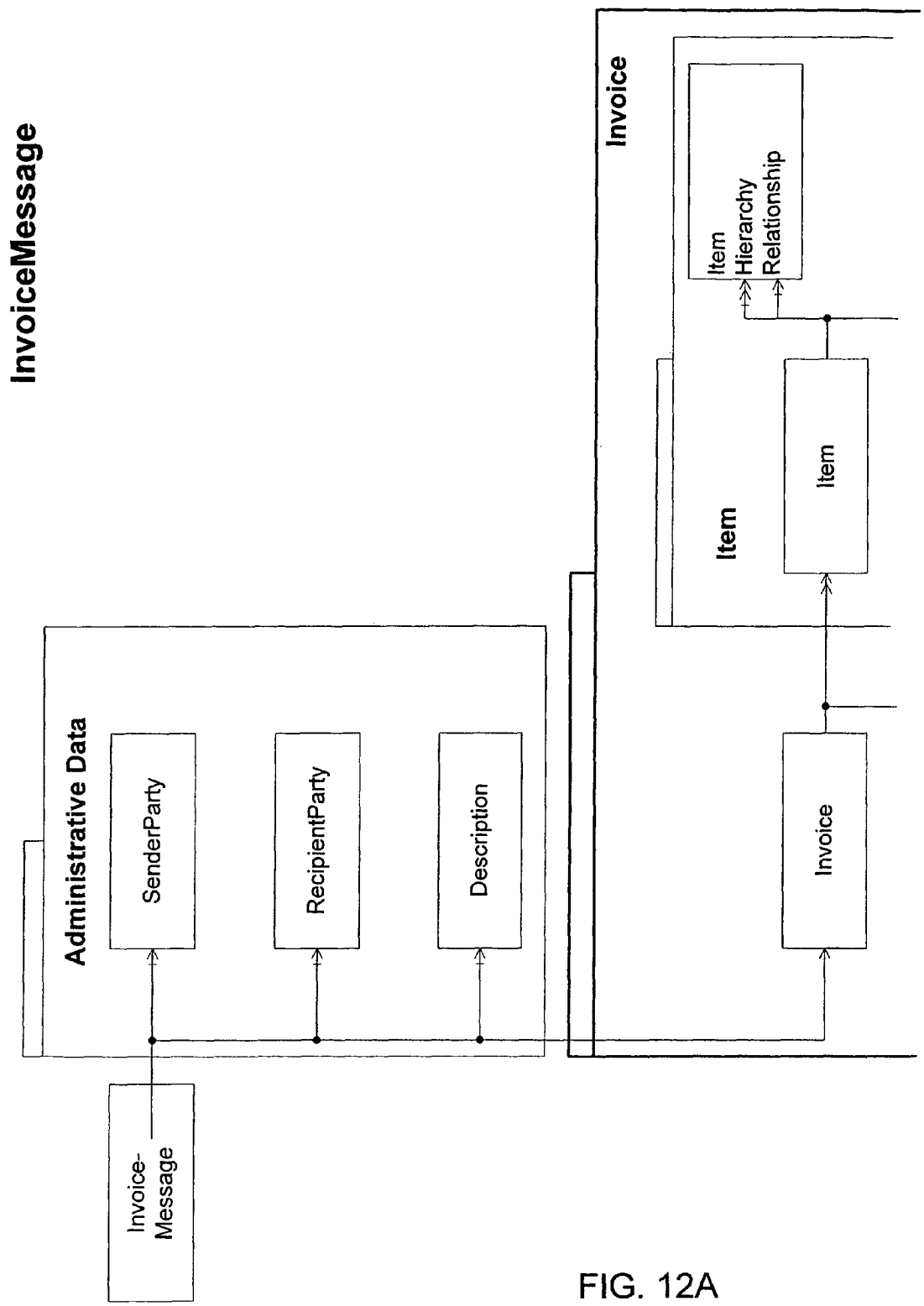
FIGS. 12A to 12E are schematic diagrams illustrating a public data template used in the workflow of FIG. 11.
Figure 12B:
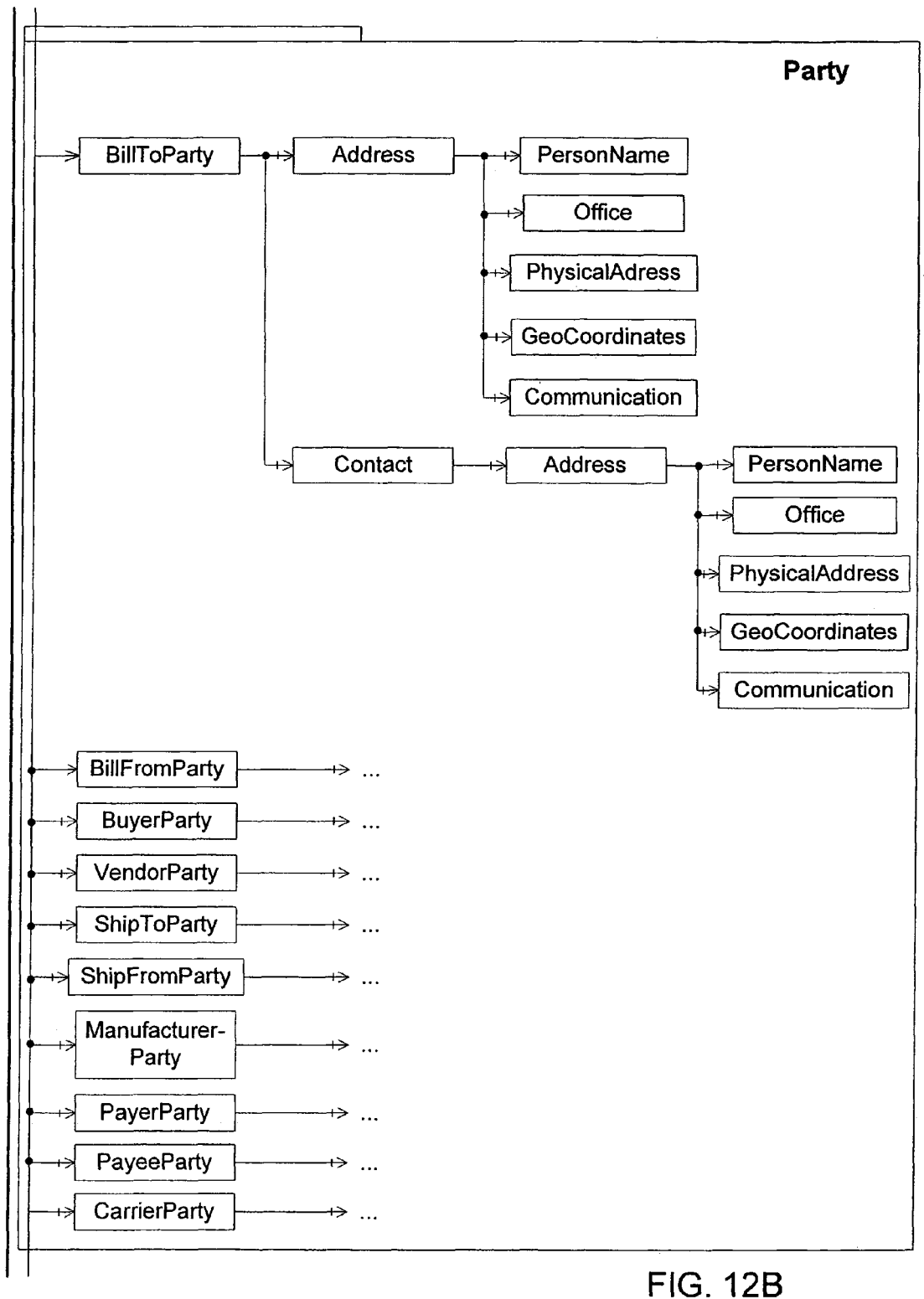
Figure 12C:
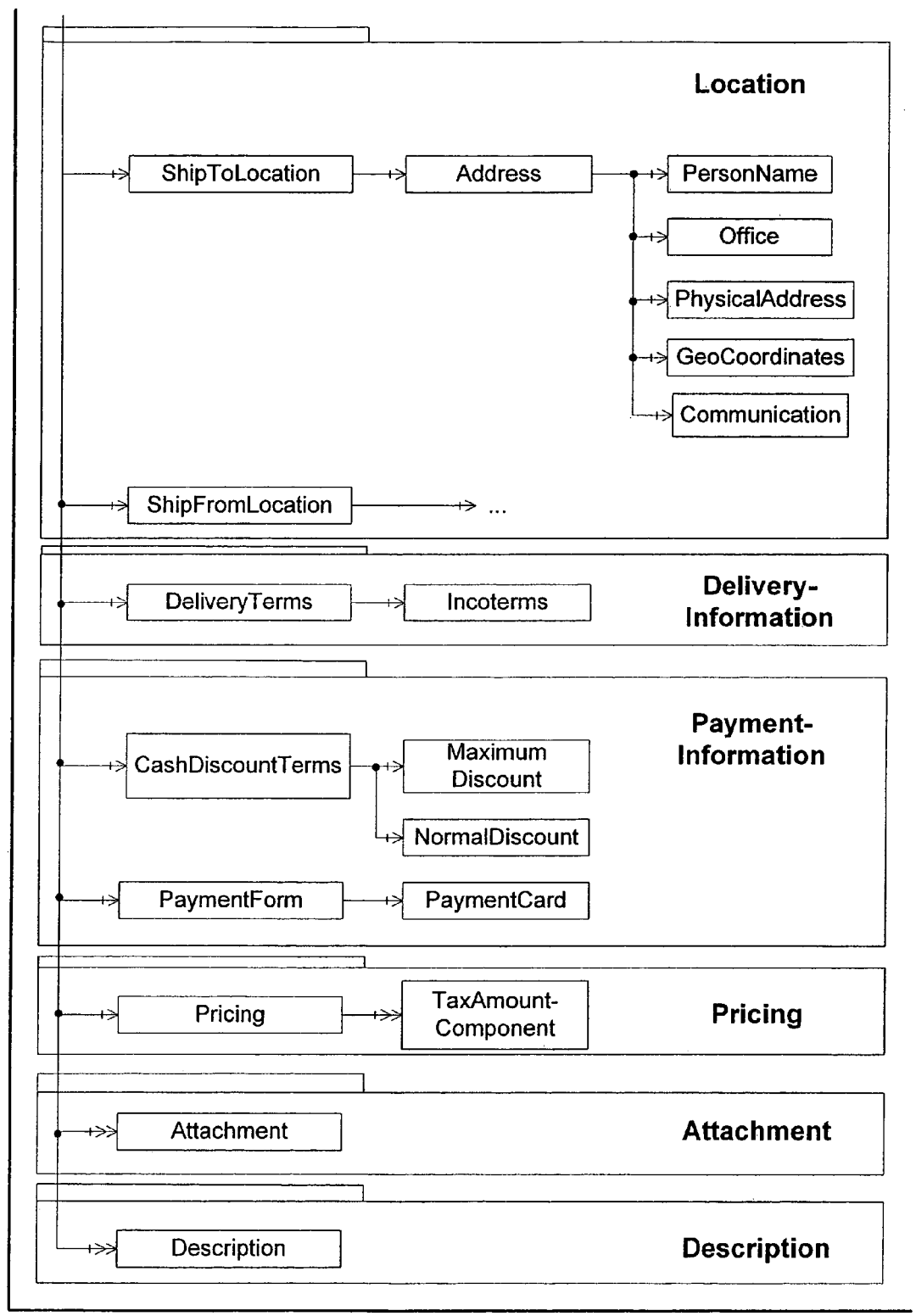
Figure 12D:
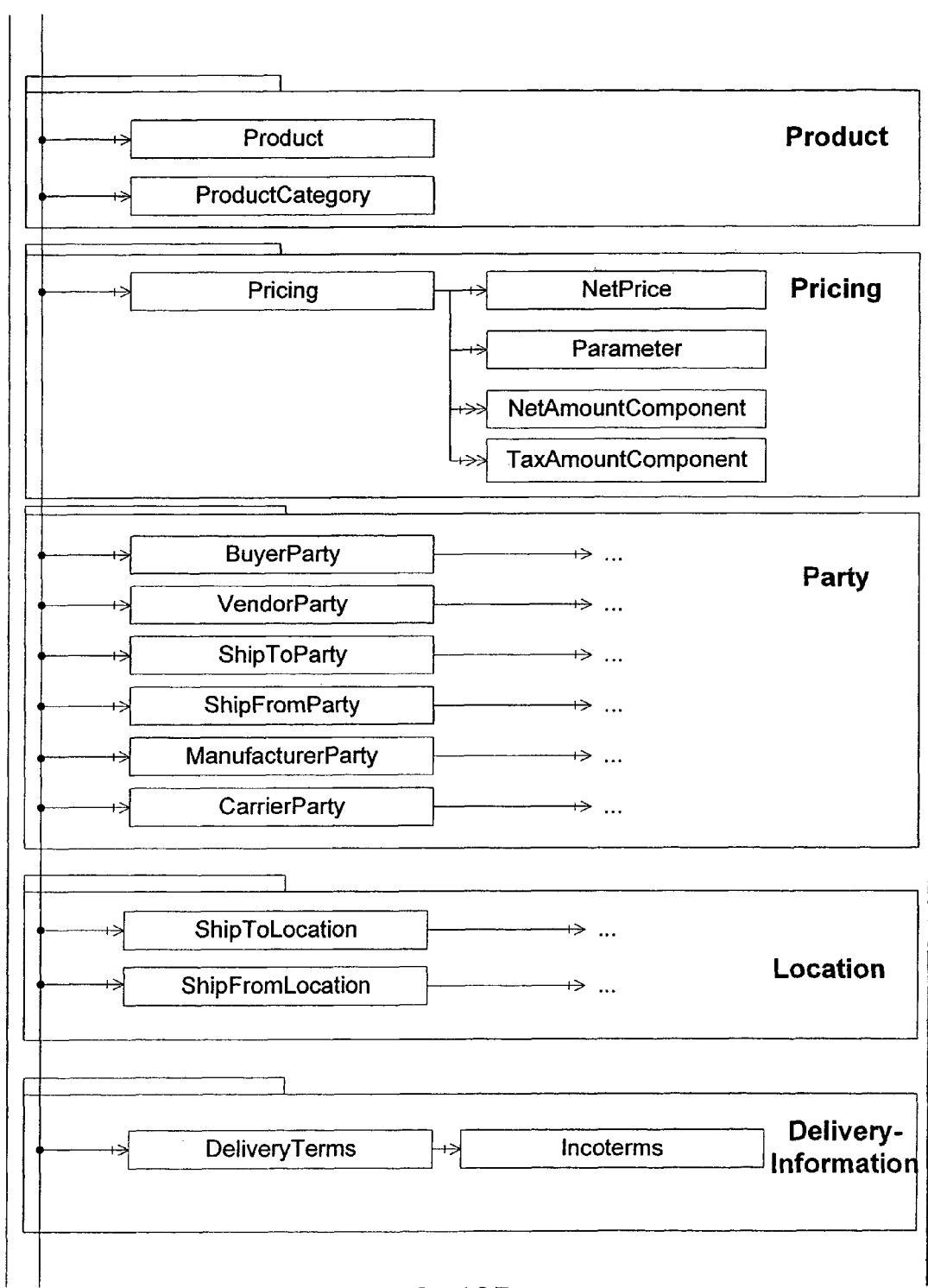
Figure 12E:
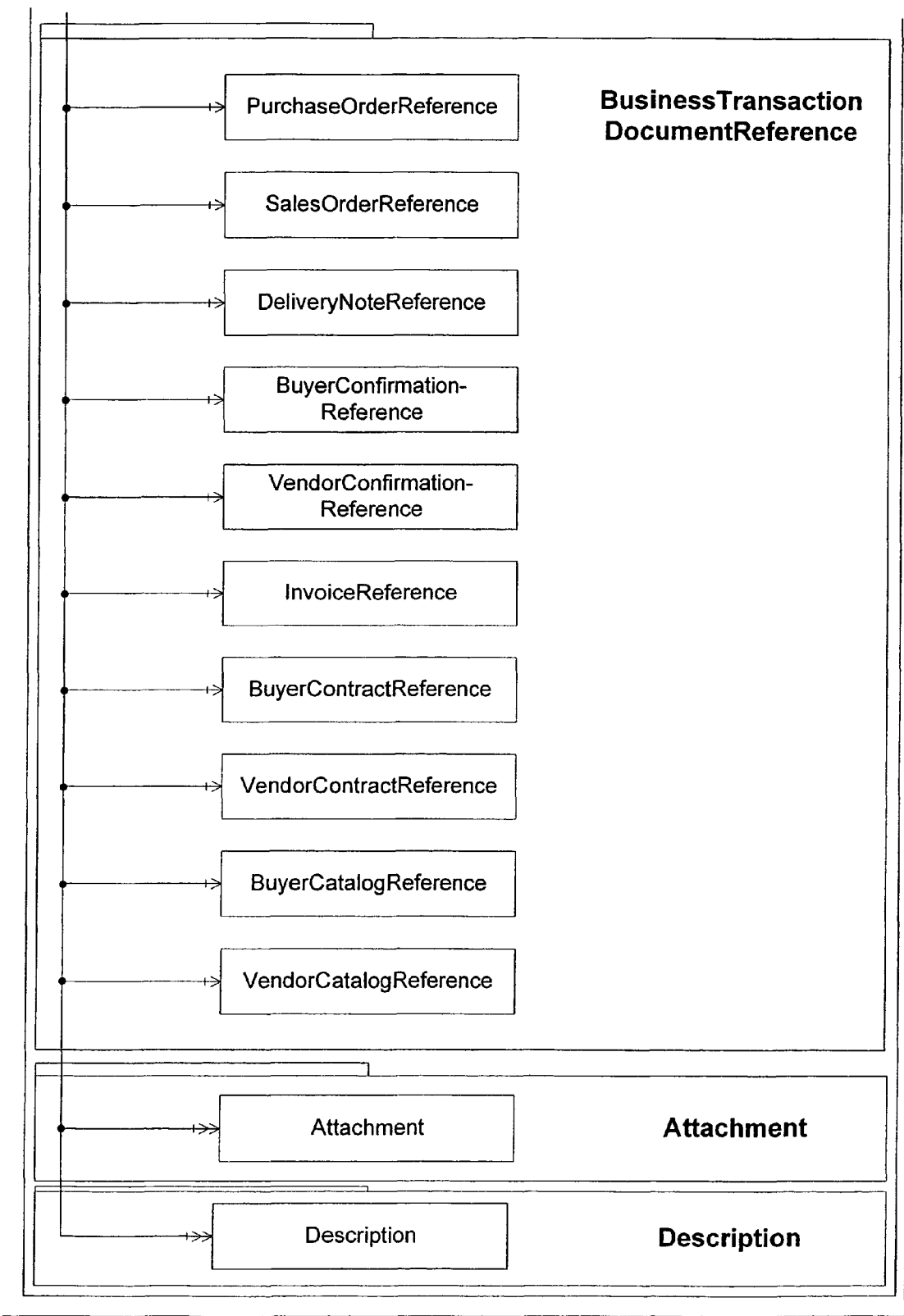

FIG. 11 schematically shows an activity diagram of an exemplary billing/invoicing workflow in which the present invention can be practiced. As illustrated in FIG. 11, the participants in the workflow include a billing computer system A and an invoicing computer system B. For the skilled artisan it will be apparent that the workflow depicted in FIG. 11 could also be practiced by interconnected computers within a single computer system.

The invoicing/billing workflow of FIG. 11 typically commences after a confirmation for the delivery of goods or services has been received by computer system A. Receipt of a delivery confirmation automatically triggers creation of invoice data within the computer system A (box 1102). The invoice data is sent with an invoice request message to the invoicing computer system B. The invoice request message includes a data structure that has been obtained by packing the invoice data in a public data template.

Upon receipt of the invoice request message, the invoicing computer system B extracts the invoice data from the invoice request message and subjects the invoice data to a confirmation process (box 1104). During the confirmation process, an acceptance status code is assigned to the invoice data. The acceptance status code is indicative of invoice acceptance, invoice rejection, or of a pending confirmation process. If the invoice data is approved and the invoice is accepted, the invoice data is transferred to a financial accounting application (box 1006) and a payment due notification as well as an invoice accounting notification are internally generated. If the invoice data are not approved (i.e., if the invoice is rejected), a routine for canceling the invoice is called (box 1008).

Regardless of the outcome of the confirmation process, the acceptance status code is included in an invoice confirmation message that is sent back to the billing computer system A. The invoice confirmation message additionally includes a data structure with the invoice data subjected to the confirmation process. The acceptance status code may be incorporated in the data structure.

Upon receipt of the invoice confirmation message, the billing computer system A evaluates the trustworthiness of the acceptance status code by performing a comparison between the invoice data transmitted via the invoice request message and the invoice data received via the invoice confirmation message. In the case of inconsistencies, a dispute management routine (box 1110) is called. Otherwise the acceptance status code is evaluated. If the acceptance status code is indicative of invoice rejection, a new invoice is created (box 1102). If, on the other hand, the acceptance status code signals that the invoice has been accepted, the invoice data are transferred to an internal financial application (box 1112).

FIGS. 12A to 12E show an embodiment of a public data template that may be used in context with the invoicing/billing workflow of FIG. 11. Technically, the public data template shown in FIGS. 12A to 12E is provided in the form of a WSDL document associated with a plurality of standardized data types included therein. The WSDL document is provided such that the individual network components involved in the workflow shown in FIG. 11 may display and, if required, supplement or modify the document in an interface repository.

Similar to the public data template shown in FIG. 5, the public data template shown in FIGS. 12A to 12E is hierarchically structured and specifies a plurality of individual data packages each including semantically related data. As becomes apparent from FIG. 12A, the public data template titled InvoiceMessage includes two larger data packages (AdministrativeData and Invoice). Data package Invoice includes data package Item shown in FIG. 12A, data package Party shown in FIG. 12B and data packages Location, DeliveryInformation, PaymentInformation, Pricing, Attachment and Description shown in FIG. 12C. Data package Item includes data packages Product, Pricing, Party, Location and DeliveryInformation shown in FIG. 12D as well as data packages BusinessTransactionDocumentReference, Attachment and Description shown in FIG. 12E.

Each of the individual data packages shown in FIGS. 12A to 12E specifies one or more standardized data types. The data package AdministrativeData shown in FIG. 12A, for example includes the standardized data types SenderParty, RecipientParty and Description. Since the standardized data types and their content is self explanatory, a further explanation thereof will be omitted. As will be apparent to the skilled artisan, the invention also encompasses the public data template shown in FIGS. 12A to 12E and in particular any combination of the data packages included therein.

As has become apparent from the description of exemplary embodiments above, the invention provides a reliable, accurate and trustworthy message transfer protocol with request and confirmation messages. In particular, the invention allows to detect transmission, formatting and processing errors that may degrade confirmation processes.

Although embodiments of the present invention have been illustrated in the accompanying drawings and described in the aforegoing description, it will be understood that the invention is not limited to the embodiments disclosed. The invention is capable of numerous rearrangements, modifications and substitutions without departing from the spirit of the invention as set forth and defined by the following claims.

What is claimed is:

1. A method for exchanging messages in a computer network using a public data template and a message transfer protocol involving the transmission of request and confirmation messages, the method comprising the steps of:

receiving at a confirming system a request message via the computer network, the request message including a first data structure generated by packing application data that requires confirmation in the public data template, wherein the first data structure includes a message identification code unique to the first data structure;

unpacking, into a different format, the application data and the message identification code included in the first data structure;

providing the unpacked application data and the message identification code to a confirmation process to generate a confirmation result;

creating a second data structure by re-packing the unpacked application data using a packing process, the packing process including packing the unpacked application data and the message identification code in the public data template;

creating a confirmation message responsive to the request message, the confirmation message including the second data structure and the message identification code, wherein the message identification code and the content of the second data structure operate in conjunction to provide a basis for resuming or resetting the processing of the application data included in the first data structure upon receipt of the confirmation result by a first message recipient; and transmitting the confirmation message via the computer network to the first message recipient as a basis for detecting inconsistencies in the confirmation result reflective of a difference between content included in the first and second data structures.

2. The method of claim 1, further comprising the step of including a confirmation result generated by the confirmation process in the confirmation message.

3. The method of claim 1, wherein the confirmation message including the application data provided to the confirmation process is transmitted as a first confirmation message, and further comprising the steps of generating a second confirmation message including the confirmation result obtained by the confirmation process and transmitting the second confirmation message via the computer network to the first message recipient.

4. The method of claim 3, further comprising the steps of:
providing at a requesting system the first data structure;
creating the request message including the first data structure;
transmitting the request message via the computer network to a second message recipient;
receiving the confirmation message via the computer network; and
comparing the content of the first data structure with the content of the second data structure to detect inconsistencies degrading the trustworthiness of the confirmation result.

5. The method of claim 4, further comprising the step of automatically calling a dispute management routine if the comparison indicates that the application data provided to the confirmation process were at least one of incorrect and incomplete.

6. The method as in any one of the preceding claims, wherein the request and confirmation messages are exchanged asynchronously.

7. The method of claim 5, further comprising the step of queuing at least one of the request messages and the confirmation messages.

8. The method of claim 7, wherein the request and confirmation messages are exchanged in context with a collaborative network-based workflow and wherein a plurality of such workflows are performed in parallel.

9. The method of claim 7, further comprising the step of queuing the messages separately for each of the plurality of workflows.

10. The method of claim 7, further comprising the step of queuing the request messages separately from the confirmation messages.

11. The method of claim 10, wherein the step of creating at least one of the request message and the confirmation message includes assigning a second identification code associated with administrative data separate from the first data structure.

12. The method of claim 10, further comprising the step of transferring the application data from an application component to an interfacing component, wherein the application component continues processing the application data under the assumption of a positive confirmation result.

13. The method of claim 12, further comprising the step of resetting the application component in the case a negative or a non-trustworthy confirmation result is generated or received.

14. The method of any one of claim 1-5, 7-9, or 11-13, wherein at least one of packing and unpacking of the application data includes a mapping operation.

15. The method of any one of claim 1-5, 7-9, or 11-13, wherein the public data template specifies two or more different data packages, each data package including semantically-related data.

16. A computer program product tangibly embodied on a non-transitory computer-readable medium comprising program code portions for performing the steps of any of claim 1-5, 7-9, or 11-13.

17. A network component for generating messages that are exchanged in a computer network using a public data template and a message transfer protocol involving the transmission of request and confirmation messages, the network component comprising:
a first interface for receiving a request message via the computer network, the request message including a first data structure and a message identification code unique to the first data structure obtained by packing application data that requires confirmation in the public data template;
a first unit for unpacking, into a different format, the application data and the message identification code included in the first data structure;
a second unit for:
providing the unpacked application data and the message identification code to a confirmation process as a basis for generating a confirmation result, and
creating a second data structure by re-packing the unpacked application data and the message identification code using a packing process in which the unpacked application data is packed in the public data template;
a third unit for creating a confirmation message responsive to the request message, the confirmation message including the second data structure and the message identification code, wherein message identification code and the content of the second data structure operate in conjunction to provide a basis for resuming or resetting processing of the application data included in the first data structure upon receipt of the confirmation result by a first message recipient; and
a second interface for transmitting the confirmation message via the computer network to the first message recipient as a basis for detecting inconsistencies in the confirmation result reflective of a difference between content included in the first and second data structures.

18. A network component for generating messages that are exchanged in a computer network using a public data template and a message transfer protocol involving the transmission of request and confirmation messages, the network component comprising:
a first unit for providing a first data structure and a message identification code unique to the first data structure obtained by packing application data, which requires confirmation, the public data template;
a second unit for creating a request message including the first data structure and the message identification code;
a first interface for transmitting the request message via the computer network to a second message recipient;

a second interface for receiving a confirmation message via the computer network from the second message recipient, the confirmation message including a confirmation result and second data structure generated by re-packing the message identification code and the application data included in the first data structure into the public data template; and a third unit for detecting inconsistencies degrading the trustworthiness of the confirmation result based on the message identification code and a comparison of the content of the first data structure with the content of the second data structure.

19. The method of claim 1, wherein the inconsistencies in the confirmation result are associated with incorrect packing or unpacking of the first or the second data structure.

20. The method of claim 1, wherein the confirmation result comprises an indication of approval, disapproval, or pending.

* * * * *